US006711184B1

(12) United States Patent
Hollemann et al.

(10) Patent No.: US 6,711,184 B1
(45) Date of Patent: Mar. 23, 2004

(54) INTRACAVITY FREQUENCY-DOUBLED DIODE-PUMPED LASER

(75) Inventors: Guenter Hollemann, Jena (DE); Wolfram Mendler, Schloeben (DE); René Beilschmidt, Jena (DE)

(73) Assignee: JENOPTIK Laser, Optik, Systeme GmbH, Jena (DE)

( * ) Notice: Subject to any disclaimer, the term of this patent is extended or adjusted under 35 U.S.C. 154(b) by 80 days.

(21) Appl. No.: 09/856,286

(22) PCT Filed: Sep. 9, 2000

(86) PCT No.: PCT/EP00/08826
§ 371 (c)(1),
(2), (4) Date: May 18, 2001

(87) PCT Pub. No.: WO01/22541
PCT Pub. Date: Mar. 29, 2001

(30) Foreign Application Priority Data

Sep. 21, 1999 (DE) .......................... 199 46 176

(51) Int. Cl.$^7$ ................................ H01S 3/10
(52) U.S. Cl. ........................... 372/22; 372/34
(58) Field of Search ............... 372/21, 22, 75, 372/34

(56) References Cited

U.S. PATENT DOCUMENTS

| | | | | |
|---|---|---|---|---|
| 4,953,166 A | * | 8/1990 | Mooradian | 372/21 |
| 5,025,446 A | * | 6/1991 | Kuizenga | 372/21 |
| 5,256,164 A | * | 10/1993 | Mooradian | 438/27 |
| 5,627,849 A | | 5/1997 | Baer | |
| 5,802,086 A | * | 9/1998 | Hargis et al. | 372/22 |
| 5,832,010 A | * | 11/1998 | Fulbert et al. | 372/22 |
| 6,002,695 A | * | 12/1999 | Alfrey et al. | 372/22 |
| 6,101,201 A | * | 8/2000 | Hargis et al. | 372/36 |
| 6,222,869 B1 | * | 4/2001 | Marshall et al. | 372/75 |

FOREIGN PATENT DOCUMENTS

| | | |
|---|---|---|
| WO | WO 96/37023 | 11/1996 |
| WO | WO 97/45901 | 12/1997 |
| WO | WO 99/18639 | 4/1999 |

OTHER PUBLICATIONS

A. Agnesi et al. "430–m Single–Transverse–Mode Diode–Pimped Nd: YVO$_4$ Laser at 671 nm" In: IEEE J. Quant. Electr., vol. 34, No. 7, 1998, pp. 1297–1300.

J.–P. Meyn et al. "Intracavity frequency doubling of a continuous–wave, diode–laser–pumped neodymium lanthanum scandium borate lasr" In: Optics Letters, vol. 19, No. 18, 1994, pp. 1436–1438.

D. Shen et al. "Efficient operation of an intracavity–doubled Nd: YVO$_4$/KTP laser end pumped by a high–brightness lase diode" In: Applied Optics, vol. 37, No. 33, 1998, pp. 7785–7788.

W. Koechner "Solid–State Laser Engineering" Springer Verlag, Berlin Heidelberg New York 1998, 2. Aufl., Abschn. 10.1.1.

* cited by examiner

*Primary Examiner*—Paul Ip
*Assistant Examiner*—Hung Vy
(74) *Attorney, Agent, or Firm*—Reed Smith LLP

(57) ABSTRACT

A diode-pumped laser is disclosed with internal frequency doubling to prevent interfering power fluctuations in the laser radiation generated by the non-linear crystal at the start of the power adjustment in a simple and, therefore, inexpensive construction without power-reducing elements in the cavity or thermal effects having a negative impact on the laser behavior. The laser contains, as laser-active medium, a solid-state laser crystal with a temperature gradient directed substantially parallel to the cavity axis. The conversion of laser radiation of a fundamental laser wavelength into laser radiation of another wavelength is carried out by a non-linear optical crystal with a lower non-linear conversion efficiency than that required for achieving maximum power of the converted laser radiation. The laser can be used particularly for medical purposes, e.g., in the field of ophthalmology for coagulation of the retina as well as in the field of dermatology.

18 Claims, 3 Drawing Sheets

INTRACAVITY FREQUENCY-DOUBLED DIODE-PUMPED LASER

CROSS-REFERENCE TO RELATED APPLICATIONS

This application claims priority of German Application No. 199 46 176.7, filed Sep. 21, 1999 and International Application No. PCT/EP00/08826, filed Sep. 9, 2000, the complete disclosure of which is hereby incorporated by reference.

BACKGROUND OF THE INVENTION a) Field of the Invention

The invention is directed to a diode-pumped laser with internal frequency doubling in which a solid-state laser crystal with a temperature gradient directed substantially parallel to the cavity axis and a nonlinear optical crystal following in the direction of the beam path for converting the laser radiation with a fundamental laser wavelength into laser radiation of another wavelength are provided inside a laser cavity as active medium.

b) Description of the Related Art

A laser of the type mentioned above is known, for example, from S. Erhard et al., Trends in Optics and Photonics, Vol. 26, Advanced Solid-State Lasers, Martin M. Fejer, Hagop Injeyan, and Ursula Keller, eds. (Optical Society of America, Washington, D.C. 1999), pp. 38–44.

For various basic reasons, the conversion of laser radiation of a fundamental laser wavelength into laser radiation of a different wavelength, e.g., generation of the second harmonic by means of a nonlinear optical crystal, is burdened by problems of nonlinear dynamics resulting in an unstable output power behavior. The causes of this instability vary in nature.

The nonlinear coupling of laser modes through nonlinear optical processes in the frequency-doubling crystal leads to intensity fluctuations in the laser, or "green problem", as it is called (T. Baer, J. Opt. Soc. Am. B3, 1175 (1986)).

The formation of thermal lenses in laser crystal and in frequency doubling crystal (KTP crystal) leads to a complex reaction of the output power as a function of the diode current, since the thermal lens influences the laser mode in the cavity and, therefore, the effectiveness of the frequency doubling which depends on the intensity of the laser field in the frequency doubling crystal. This prevents adjustment of power via the diode current.

The technical solutions offered by the prior art solve only partial problems without meeting the requirements as a whole.

For generating stable laser output powers, it is known to let laser cavities operate either in multimode (>100) operation or in monomode operation.

U.S. Pat. No. 5,446,749 provides a laser arrangement with a particularly long cavity. Operation with stable amplitude is achieved by means of exciting many longitudinal modes. The output power of the laser is not adjustable via the diode current because of the strong thermal lens formed in the utilized laser crystal rod, since a power fluctuation occurs in the generated second harmonic at the start of power adjustment. The particularly long cavity results in large dimensions of the laser produced in this way and entails high costs.

For monomode operation, it is known [S. Erhard et al., Trends in Optics and Photonics, vol. 26, Advanced Solid-State Lasers, Martin M. Fejer, Hagop Injeyan, and Ursula Keller, eds. (Optical Society of America, Washington, D.C. 1999), pp. 38–44] to generate the second harmonic through internal frequency doubling in a cavity of a Yb:YAG disk laser, as it is called, in which the utilized laser-active solid state medium is shaped like a thin disk whose dimension in the propagation direction of the laser radiation (laser axis) is sharply reduced in relation to the other dimensions. According to DE 43 44 227 A1, a laser crystal of this kind is fastened to a sturdy cooling element by its surface which is directed at right angles to the laser propagation direction. Accordingly, a temperature gradient predominantly parallel to the laser axis is formed in the crystal, so that the formation of an interfering thermal lens is sharply reduced. The described laser uses a long cavity (approximately 1 m) with a noncritical temperature phase-matched LBO crystal as nonlinear optical crystal. Monomode operation is compelled in a known manner in that etalons and birefringent filters are placed in the cavity to reduce the number of longitudinal modes. These are expensive, require very sensitive adjustment and cause intracavity losses, so that the effectiveness of the laser is reduced to the indicated 15.5%.

This object is met by a diode-pumped laser with internal frequency doubling in which a solid-state laser crystal with a temperature gradient directed substantially parallel to the cavity axis and a non-linear optical crystal following in the direction of the beam path for converting the laser radiation with a fundamental laser wavelength into laser radiation of another wavelength are provided inside a laser cavity as active medium, wherein the conversion of the laser radiation with fundamental laser wavelength into laser radiation of another wavelength is carried out with a lower non-linear conversion than required for achieving maximum power of the converted laser radiation.

U.S. Pat. No. 5,511,085 discloses another solution in the form of a microchip laser with small cavity length and intracavity nonlinear crystal. While the number of transverse modes is already limited by end-pumping, intracavity etalon effects further reduce the longitudinal mode spectrum through additional coatings on the laser crystal or nonlinear crystal. Strong thermal effects put increased stress on the optical elements, limit the laser output power and accordingly restrict the uses of the laser. This also makes adjustment of the arrangement more difficult.

OBJECT AND SUMMARY OF THE INVENTION

It is the primary object of the invention to prevent interfering power fluctuations in the laser radiation generated by means of the nonlinear crystal at the start of the power adjustment in a simple and, therefore, inexpensive construction without power-reducing elements in the cavity or thermal effects having a negative impact on the laser behavior.

This object is met by a diode-pumped laser with internal frequency doubling in which a solid-state laser crystal with a temperature gradient directed substantially parallel to the cavity axis and a nonlinear optical crystal following in the direction of the beam path for converting the laser radiation with a fundamental laser wavelength into laser radiation of another wavelength are provided inside a laser cavity as active medium, wherein the conversion of the laser radiation with fundamental laser wavelength into laser radiation of another wavelength is carried out with a lower effectiveness than required for achieving maximum power of the converted laser radiation.

The effectiveness of the conversion can be adjusted substantially through the longitudinal dimensions of the nonlinear optical crustal along the cavity axis and should be in a range of 50% to 90% of the effectiveness at which the maximum power of the converted laser radiation can be achieved.

In contrast to the known solutions, a compact, short cavity is used in which a few modes are generated and in which additional mode-selective elements are dispensed with. As is well known, a step of this kind would not lead to a stable output power with intracavity frequency doubling. This stability is first achieved by the low conversion effectiveness by means of the nonlinear crystal which is constructed in a particularly way.

As a result of the construction of the laser-active medium as a disk-shaped solid-state laser crystal with low amplification and a substantial temperature gradient in the direction of the cavity axis, the disruptive effect of a thermal lens on the mode distribution is already sharply reduced. A residual action of a thermal lens forming in the laser-active medium in spite of the temperature gradient directed predominantly parallel to the cavity axis is eliminated in that its focal length is adjusted so as to be greater than the cavity length.

The principle of the disk laser is not used in the present invention to achieve the highest beam qualities for high-power lasers in continuous wave mode. The invention makes use of the characteristic of the stability of the thermal lens during changes in pump output which is required for the large dynamic range, i.e., a stable operation at very small outputs of about 20 mW, but also at very high outputs of about 4 W, as well as for switching ability (switch-on process).

The beam quality of the laser radiation generated by means of the nonlinear optical crystal is characterized by a diffraction number $M^2$ between one and ten.

Various types of crystal can be used as nonlinear optical crystals. It is advantageous to use an LBO crystal with a crystal length of 2 mm to 10 mm through which a frequency doubling with critical angle phase matching is generated, which has a positive effect on the low conversion effectiveness to be used.

Various solid-state laser crystal such as $Nd:YVO_4$ with an Nd doping of 0.5% to 2% and Nd:YAG with an Nd doping of 0.5% to 1.5% are suitable for the laser-active medium.

By reducing the crystal length, the effect occurring in the KTP crystal is the same as that occurring in the disk-shaped laser crystal, whereby the effect of a thermal lens is diminished. Further, this has the advantage of low adjustment sensitivity resulting in economical assembly. The temperature sensitivity and the minimizing of absorption losses are further characteristics of short frequency doubling crystals leading to advantages with respect to cost.

The laser cavity is advantageously folded by means of a folding mirror serving as out-coupling mirror and has a cavity axis directed to the folding mirror at an incident angle of less than 10° to prevent astigmatism.

A recommended pump arrangement has at least one laser diode line which is either coupled with fiber optics or its pump radiation is transmitted by free-radiating optics.

It is also advantageous for forming a cavity end mirror when an end face of the optically nonlinear crystal directed away from the cavity interior is provided with a dielectric coating which is highly reflective for the laser fundamental wave and for the second harmonic generated by the nonlinear optical crystal.

In order to reduce losses, the cavity axis should be directed at right angles to crystal faces of the laser-active medium and of the nonlinear optical crystal, which faces work parallel to one another.

Various solid bodies such as $Nd:YVO_4$ with an Nd doping of 0.5% to 2% and Nd:YAG with an Nd doping of 0.5% to 1.5% are suitable for the laser-active medium.

Nd:YALO crystals, Nd:YLF crystals or Nd:LSB crystals can also be used.

A more compact and economical construction can be realized by the invention, wherein output powers with stable amplitude and maximum fluctuations of 5% can be achieved. A laser output power in a range of 10 mW to 4 W and a square-pulse duration between 10 ms and continuous wave can be adjusted via the diode current, i.e., a preselected output power can be achieved in a stable manner in approximately 1 ms. A high overall effectiveness is achieved by means of the small quantity of intracavity elements which lead to losses. Due to the fact that strong thermal effects are prevented, the solution according to the invention is also suitable for high laser output powers such as are required, e.g., for applications in dermatology.

The invention will be described more fully in the following with reference to the schematic drawing.

DESCRIPTION OF THE PREFERRED EMBODIMENTS

Figures 1, 2:
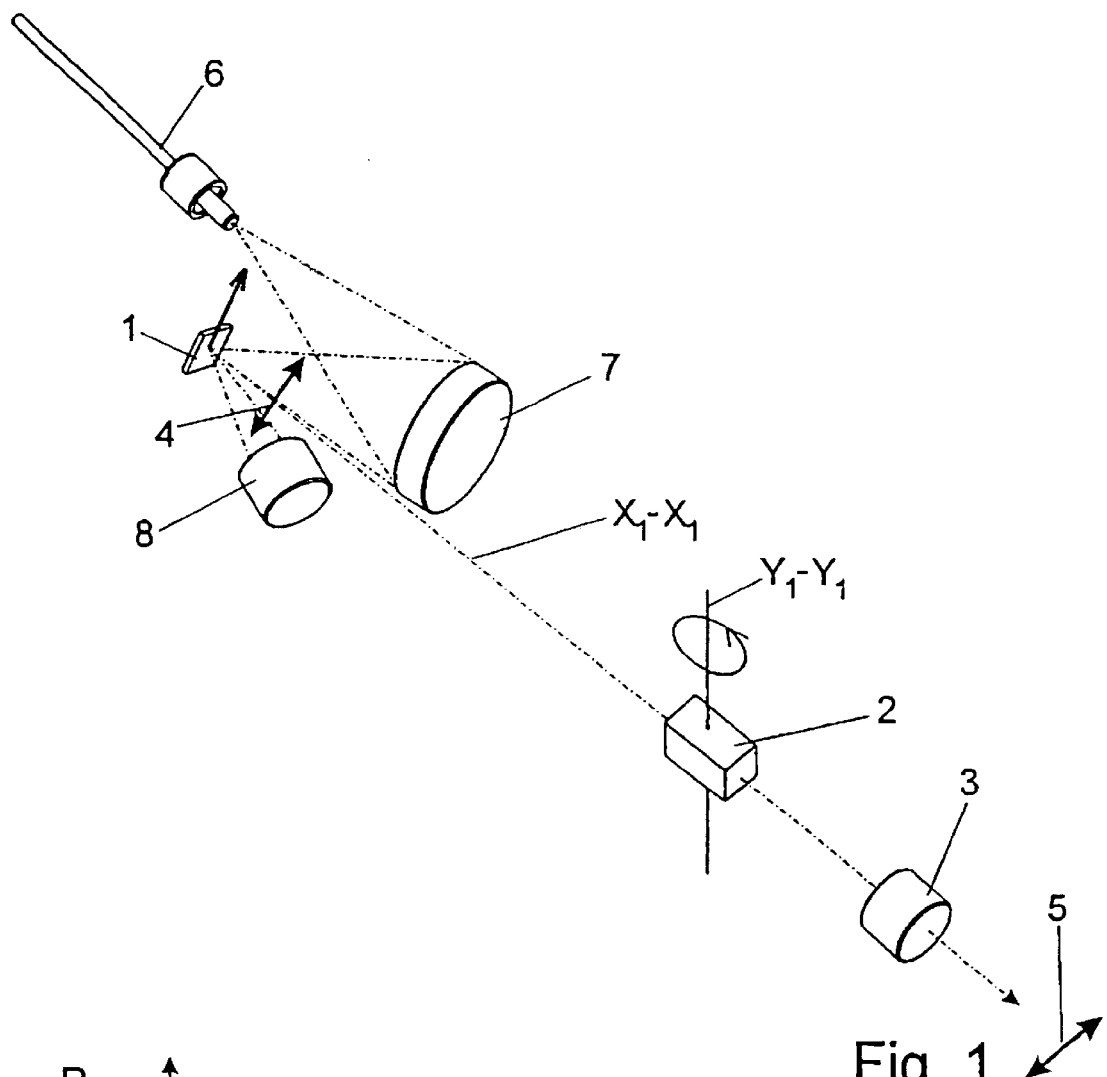
FIG. 1 shows a first laser construction.
FIG. 2 shows the relationship between the conversion effectiveness with frequency conversion by means of the nonlinear crystal and the power of the converted laser radiation to be achieved.

The laser construction shown in FIG. 1 contains, as active medium in the cavity, an $Nd:YVO_4$ laser crystal 1 formed as a laser crystal disk; the smallest of its dimensions (0.4 mm×4 mm×4 mm) being 0.4 mm in the direction of the cavity axis $X_1$—$X_1$. The laser crystal disk is fastened by its large-area side facing away from the interior of the cavity to a cooling element (not shown) which serves to generate a temperature gradient in the solid state medium that is directed predominantly parallel to the cavity axis $X_1$—$X_1$. The only intracavity element, serving as frequency multiplier element, is a nonlinear optical crystal 2 in the form of a KTP crystal with type II critical angle phase matching, whose dimensions are 2 mm×3 mm×3 mm. In order to reduce losses, the surfaces in each of the crystals 1 and 2 impinged on by the laser radiation work parallel to one another and at right angles to the cavity axis $X_1$—$X_1$.

The shortest dimension of the nonlinear optical crystal also extends in the direction of the cavity axis $X_1$—$X_1$, so that the degree of conversion of laser radiation of fundamental wavelength into the second harmonic by nonlinear out-coupling is very low. Other possibilities for adjusting the degree of conversion are determined by the cavity design and by the nonlinear optical crystal with its nonlinear optical coefficients. FIG. 2 shows the relationship between this conversion effectiveness $\eta_{SHG}$ and the achievable output of the second harmonic $P_{SHG}$. It is clear that the output initially increases with increasing conversion effectiveness $\eta_{SHG}$ (degree of nonlinear out-coupling) until an output maximum $P_{MAX}$ is reached at an optimum conversion effectiveness $\eta_{OPT}$. A further increase in conversion effectiveness entails a reduction in power. According to the invention, the conversion effectiveness $\eta_{SHG}$ selected for the laser construction is considerably lower than the optimum conversion effectiveness $\eta_{OPT}$, so that the conversion lies in a range of low effectiveness in which the ratio of the radiation power of the generated second harmonic to the circulating radiation power of the laser fundamental wave is relatively small. A range of 50% to 90% of the optimum conversion effectiveness $\eta_{OPT}$ is preferably selected. If this preferred range is still not reached, the nonlinear dynamics remain advantageous, but the output of the second harmonic is too low.

Figure 3:
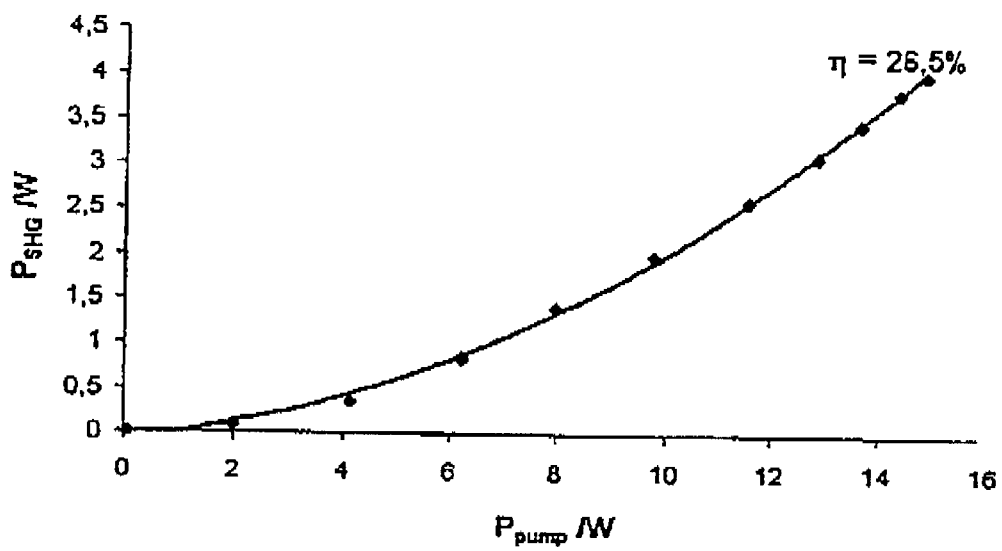
FIG. 3 shows a typical laser characteristic line for a laser according to the invention.

A selected range of this type for the conversion effectiveness $\eta_{SHG}$ contrasts with the usual procedure in which an optimum conversion effectiveness $\eta_{OPT}$ is used so that a high power $P_{SHG}$ is achieved for the second harmonic at the lowest possible fundamental wave output. However, through the step of selecting a low conversion effectiveness, particularly through the use of a short crystal length for the nonlinear optical crystal, a stable laser behavior can be achieved even at higher powers. The reason for the high total effectiveness which can nevertheless be achieved in the conversion of optical pump output $P_{pump}$ to optical output power $P_{SHG}$ of the laser of more than 25% (FIG. 3) is that the invention makes it possible to eliminate elements from the cavity which cause losses. FIG. 3 shows a strictly monotonously increasing laser characteristic which is steady, stable over time and reproducible in an exemplary manner.

A concave out-coupling mirror 3 is used to couple out the second harmonic in the green spectral region that is generated by the nonlinear optical crystal 2 by halving the fundamental wavelength of 1064 nm. The radius of curvature of the concave out-coupling mirror 3 is selected in such a way that desired beam waists are adjusted in both crystals 1 and 2. The out-coupling mirror 3 is designed to be highly reflecting for 1064 nm and highly transmitting for 532 nm. The fundamental wave generated by the Nd:YVO$_4$ crystal 1 has a polarization direction 4 which encloses an angle of 45° with the horizontal polarization direction 5 of the second harmonic. Since the crystallographic C-axis which is also the polarization axis is inclined at an angle of 45° to the horizontal cavity plane, the phase matching angle can be adjusted by rotation of the type II phase-matched KTP crystal 2 with a vertical arrangement of the crystallographic z-axis of the nonlinear crystal relative to the cavity plane about an axis Y-Y directed vertical to the cavity plane.

Figure 4:
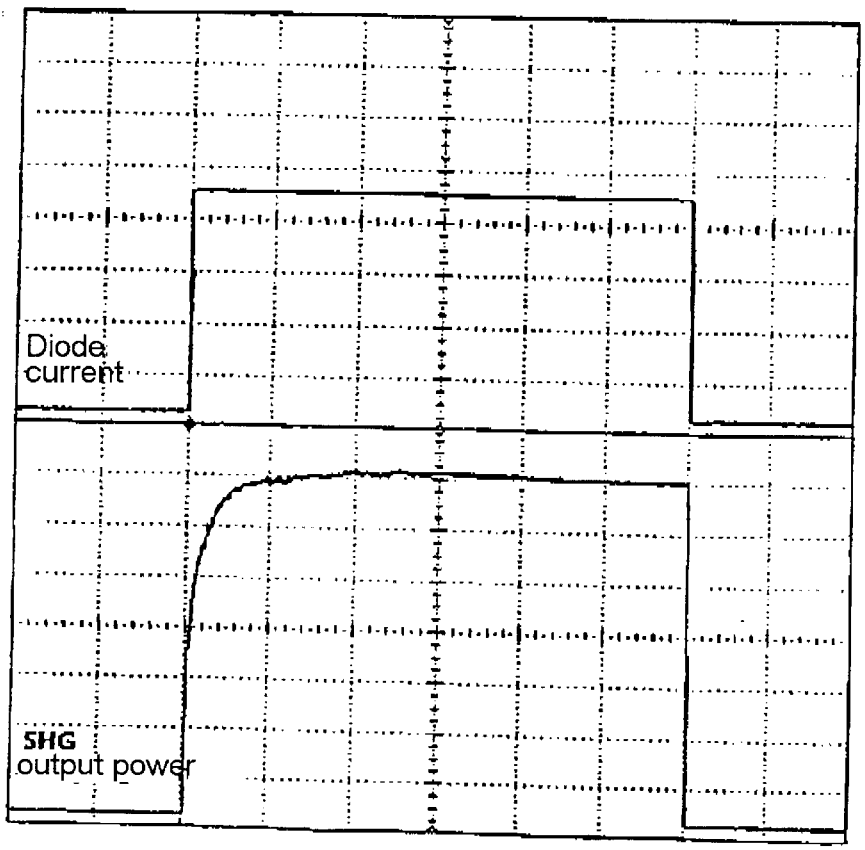
FIG. 4 shows a comparison of pulse shapes between the diode current serving to control output and the adjustment of the laser output power.

A pump arrangement in which laser diode pumping radiation is directed to the crystal 1 via fiber optics 6 by means of a concave mirror 76 is provided for pumping the Nd:YVO$_4$ crystal 1. The mirror 7 and another concave mirror 8 are arranged in such a way that a total of 4 passes of pump radiation through the disk-shaped crystal 1 is possible. The pump power density must be selected in such a way that the focal length of a thermal lens) forming in spite of the temperature gradient directed predominantly parallel to the cavity axis $X_1$-$X_1$, is substantially greater for all pump powers than the cavity length. The cavity mode and the output power are accordingly only influenced to a slight extent. Suitable pump power densities are less than 1.5 kW/cm$^2$, for example; thermal lenses should have focal lengths, for example, of 1 to 4 m with a cavity length of 100 mm. In the present example, a length of 200 mm was chosen for a possible cavity length of 50 to 250 mm which is limited by a highly reflective coating of the large-area side of the laser crystal disk connected with the cooling element and by the out-coupling mirror 3. The output power $P_{SHG}$ of the laser according to the invention has the curve shape shown in FIG. 4. It is clear that interfering power fluctuations at the start of the power adjustment by means of the diode current (also shown) of the laser diode used for pumping are eliminated.

Figure 5:
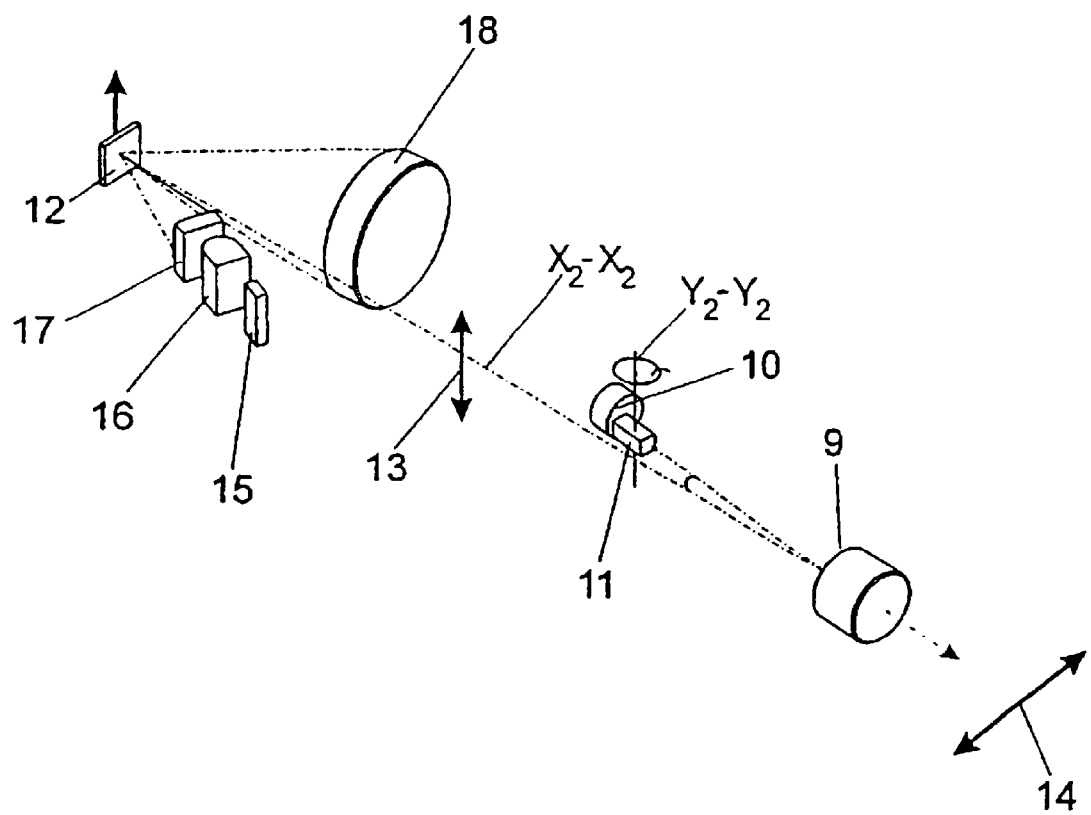
FIG. 5 shows a second laser construction.

In a second construction of the invention according to FIG. 5, a laser cavity folded in V-shaped manner with a folding mirror 9 serving as out-coupling mirror and an end mirror 10 are used; again, the only intracavity element contained in the laser cavity is a nonlinear optical crystal 11, in this case, an LBO crystal. In order to reduce losses, the cavity axis $X_2$—$X_2$ is also directed at right angles to crystal faces of crystals 1 and 12, which crystal faces work parallel to one another. The laser-active medium 12 is identical to the construction according to FIG. 1 with respect to type and construction, wherein the invention is not limited to an Nd:YVO$_4$ laser crystal. Aside from the Nd:YVO$_4$ with an Nd doping of 0.5% to 2%, Nd:YAG (doping: 0.5%–1.5%), Nd:YAlO, Nd:YLF or Nd:LSB can also be used, for example. The polarization directions of the laser fundamental wave and of the second harmonic are designated by 13 and 14. The pump arrangement in this laser construction is formed of at least one laser diode line 15 whose laser radiation is directed to the crystal 11 through optical imaging elements employed in conventional manner, such as a cylindrical collimating lens 16 acting at night angles to the plane of the p-n junction and a non-spherical lens 17. This crystal 11 is advantageously ground on two sides in such a way that a beam incidence angle of 10° to 30° can be realized on the crystal 11. For a third and fourth pass of the pump radiation through the crystal 11, a spherical mirror 18 is suitably arranged in such a way that, after exiting from the crystal 11, the pump radiation is reflected back into itself again. The elliptic pump focus is adjusted by the diameter required to adjust a beam quality characterized by a diffraction number $M^2<5$ with a short cavity of 50 mm to 250 mm length. However, for present purposes, it is also sufficient when the diffraction number $M^2$ is in the range of 1 to 10. Medical applications of the laser according to the invention, particularly for coagulation of the retina, require beam qualities at which the applied spot can generate an adequate coagulating effect by its homogeneity. Likewise, an effective in-coupling and out-coupling of at least 90% of the generated frequency-doubled laser radiation must be ensured in a non-coated glass fiber downstream of the laser output.

The critically phase-matched LBO crystal should have a length of 2 mm to 10 mm, so that a low nonlinear out-coupling of the frequency-doubled radiation from the laser fundamental wave and, consequently, low nonlinear fluctuations of the laser output power result. It is also possible to construct the nonlinear optical crystal as a thin disk analogous to disk laser technology.

Although reduction in the nonlinear conversion effectiveness is brought about, in addition, by the critical angle phase matching, as is desirable according to the invention, it is also possible to use the LBO crystal with the usual noncritical temperature phase matching.

Instead of using an end mirror 10, it is also possible to make the nonlinear optical crystal 11 highly reflective for the laser fundamental wave and the second harmonic at its end face through the use of a dielectric coating.

The person skilled in the art knows that a cavity with an internal lens can also be used alternatively, or a simple linear two-mirror cavity which is dimensioned in such a way that optimum beam waists occur simultaneously in the laser crystal and in the nonlinear optical crystal, wherein the laser crystal can also be used as a folding mirror. The end faces of the optically active elements of the cavity can also be constructed as imaging surfaces.

While the foregoing description and drawings represent the present invention, it will be obvious to those skilled in the art that various changes may be made therein without departing from the true spirit and scope of the present.

What is claimed is:

1. A diode-pumped laser with internal frequency doubling comprising:

a solid-state laser crystal disk being provided inside a laser cavity as a laser-active medium;

a solid-state laser crystal disk which shortest dimension is directed along the cavity axis and having two large area surfaces;

one of the two large area surfaces being mounted to a cooling element to generate a temperature gradient in the crystal disk that is directed predominantly parallel to the cavity axis;

a non-linear optical crystal for converting laser radiation with a fundamental laser wavelength into laser radiation of another wavelength with a non-linear conversion efficiency ($\eta_{SHG}$) determined by the non-linear optical crystal;

wherein conversion of the laser radiation with fundamental laser wavelength into laser radiation of another wavelength is carried out with a lower non-linear conversion efficiency ($\eta_{SHG}$) than that required for achieving maximum power of the converted laser radiation.

2. The diode-pumped laser according to claim 1, wherein the effectiveness of the conversion ($\eta_{SHG}$) is in a range of 50% to 90% of the effectiveness at which the maximum power of the converted laser radiation can be achieved.

3. The diode-pumped laser according to claim 2, wherein the conversion effectiveness ($\eta_{SHG}$) is adjusted substantially by the length dimensions of the nonlinear optical crystal along the cavity axis.

4. The diode-pumped laser according to claim 3, wherein a thermal lens forming in the laser-active medium in spite of the temperature gradient directed predominantly parallel to the cavity axis has a focal length that is greater than the cavity length.

5. The diode-pumped laser according to claim 4, wherein the beam quality of the laser radiation generated by means of the nonlinear optical crystal is characterized by a diffraction number $M^2$ between one and ten.

6. The diode-pumped laser according to claim 5, wherein an LBO crystal with a crystal length of 2 mm to 10 mm through which a frequency doubling with critical angle phase matching is generated is used as nonlinear optical crystal.

7. The diode-pumped laser according to claim 5, wherein a KTP crystal with type II critical angle phase matching and a crystal length of 1 mm to 5 mm is used as nonlinear optical crystal.

8. The diode-pumped laser according to claim 5, wherein the nonlinear optical crystal is constructed as an LBO crystals with type I noncritical temperature phase matching and a crystal length of 2 mm to 10 mm.

9. The diode-pumped laser according to claim 6, wherein the laser cavity is folded by a folding mirror serving as out-coupling mirror and has a cavity axis directed to the folding mirror at an incident angle of less than 10°.

10. The diode-pumped laser according to claim 9, wherein at least one laser diode line which is coupled with fiber optics is used as a pumping arrangement.

11. The diode-pumped laser according to claim 9, wherein at least one laser diode line with free-radiating optics is used as a pumping arrangement for transmitting the pump radiation.

12. The diode-pumped laser according to claim 11, wherein an end face of the nonlinear optical crystal directed away from the cavity interior is provided for forming a cavity end mirror with a dielectric coating which is highly reflective for the laser fundamental wave and for the second harmonic generated by the nonlinear optical crystal.

13. The diode-pumped laser according to claim 12, wherein the cavity axis is directed at right angles to crystal faces of the laser-active medium and of the nonlinear optical crystal, the faces of which work parallel to one another.

14. The diode-pumped laser according to claim 13, wherein an Nd:YVO$_4$ crystal with an Nd doping of 0.5% to 2% is used as laser-active medium.

15. The diode-pumped laser according to claim 13, wherein an Nd:YAG with an Nd doping of 0.5% to 1.5% is used as laser-active medium.

16. The diode-pumped laser according to claim 13, wherein an Nd:YALO crystal is used as laser-active medium.

17. The diode-pumped laser according to claim 13, wherein an Nd:YLF crystal is used as laser-active medium.

18. The diode-pumped laser according to claim 13, wherein an Nd:LSB crystal is used as laser-active medium.

* * * * *